United States Patent
Curtis et al.

(10) Patent No.: US 11,197,054 B2
(45) Date of Patent: Dec. 7, 2021

(54) LOW LATENCY DISTRIBUTION OF AUDIO USING A SINGLE RADIO

(71) Applicant: ROKU, INC., San Jose, CA (US)

(72) Inventors: Robert Caston Curtis, Los Gatos, CA (US); Mike Kristoffersen, Kongerslev (DK); Rafal Malewski, Aalborg (DK); Rafal Zwierz, Cambridge (GB)

(73) Assignee: ROKU, INC., Los Gatos, CA (US)

( * ) Notice: Subject to any disclaimer, the term of this patent is extended or adjusted under 35 U.S.C. 154(b) by 157 days.

(21) Appl. No.: 16/689,749

(22) Filed: Nov. 20, 2019

(65) Prior Publication Data
US 2020/0186864 A1 Jun. 11, 2020

Related U.S. Application Data

(60) Provisional application No. 62/775,450, filed on Dec. 5, 2018.

(51) Int. Cl.
*H04N 21/43* (2011.01)
*H04N 21/4363* (2011.01)
(Continued)

(52) U.S. Cl.
CPC ......... *H04N 21/4307* (2013.01); *G10L 25/51* (2013.01); *H04N 21/439* (2013.01);
(Continued)

(58) Field of Classification Search
CPC ......... H04N 21/4307; H04N 21/43637; H04N 21/439; G10L 25/51; H04R 3/12; H04R 2420/07
See application file for complete search history.

(56) References Cited

U.S. PATENT DOCUMENTS 9,350,941 B2 5/2016 Kim
2009/0222116 A1* 9/2009 Kang ............... H04M 1/72412
700/94
(Continued)

FOREIGN PATENT DOCUMENTS

KR 10-20110080375 A 7/2011

OTHER PUBLICATIONS

International Search Report and Written Opinion of the International Searching Authority directed to related International Patent Application No. PCT/US2019/064445, dated Mar. 26, 2020; 9 pages.

*Primary Examiner* — Sunghyoun Park
(74) *Attorney, Agent, or Firm* — Sterne, Kessler, Goldstein & Fox P.L.L.C.

(57) ABSTRACT

Provided herein are system, apparatus, article of manufacture, method and/or computer program product embodiments, and/or combinations and sub-combinations thereof, for distributing audio by a media device to wireless speakers while content comprising the audio is being played on a display device, wherein the media device includes a single wireless radio. Some embodiments operate by: determining that the media device is not a source of the content, such that the media device does not need to stream the content over a first wireless network; informing the audio speakers to switch from the first wireless network to a second wireless network; disconnecting the media device from the first wireless network; establishing the second wireless network; and providing the audio to the wireless speakers for playback over the second wireless network.

19 Claims, 6 Drawing Sheets

(51) Int. Cl.
*G10L 25/51* (2013.01)
*H04N 21/439* (2011.01)
*H04R 3/12* (2006.01)

(52) U.S. Cl.
CPC ......... *H04N 21/43637* (2013.01); *H04R 3/12* (2013.01); *H04R 2420/07* (2013.01)

(56) References Cited

U.S. PATENT DOCUMENTS

| | | | |
|---|---|---|---|
| 2011/0234902 A1* | 9/2011 | Shenoi | H04L 7/005 |
| | | | 348/515 |
| 2012/0169837 A1 | 7/2012 | Olofsson et al. | |
| 2012/0182386 A1 | 7/2012 | Vrbas et al. | |
| 2017/0195769 A1* | 7/2017 | Chang | H04R 1/1041 |
| 2018/0160192 A1 | 6/2018 | Wu et al. | |
| 2020/0092525 A1* | 3/2020 | Koike | H04N 9/3129 |
| 2020/0112810 A1* | 4/2020 | Young | H04S 7/304 |

\* cited by examiner

LOW LATENCY DISTRIBUTION OF AUDIO USING A SINGLE RADIO

CROSS REFERENCE TO RELATED APPLICATIONS

This application claims priority to U.S. Provisional Application No. 62/775,450 titled "Low Latency Distribution Of Audio Using A Single Radio," filed Dec. 5, 2018, and is related to U.S. patent application Ser. No. 16/128,565 titled "Adaptive Switching In a Whole Home Entertainment System," filed Sep. 12, 2018, and U.S. patent application Ser. No. 16/133,802 titled "Dynamically Switching To/From A First Network During Audio Playback Over HDMI/ARC," filed Sep. 18, 2018, all of which are herein incorporated by reference in their entireties.

BACKGROUND

Field

This disclosure is generally directed to wirelessly distributing audio when playing content, such as a movie or TV show.

Background

When playing content on a TV, such as a movie or TV show, the playback of audio should be synchronized with the playback of the corresponding video. Otherwise, the user's viewing experience can be greatly diminished.

But, synchronizing audio and video can be a challenge in whole home entertainment systems where the home wireless network is being used to transmit the audio to wireless speakers. This is the case because a media player (or other device) could be simultaneously using the home network to stream the content from a content source. Even if, instead, the content is being provided by a non-streaming source (such as cable, satellite, DVD/Blu-Ray player, etc.), many devices could be using the home network to access the Internet. Due to this burden on the home network, there may be delays or latency with delivering the audio to the wireless speakers, and this latency may make it difficult to synchronize the audio and video playback.

SUMMARY

Provided herein are system, apparatus, article of manufacture, method and/or computer program product embodiments, and/or combinations and sub-combinations thereof, for distributing audio by a media device to wireless speakers while content comprising the audio is being played on a display device, wherein the media device includes a single wireless radio.

Some embodiments operate by: determining that the media device is not a source of the content, such that the media device does not need to stream the content over a first wireless network (such as a home wireless network); informing the audio speakers to switch from the first wireless network to a second wireless network (in other words, informing the audio speakers to move to a "clean channel"); disconnecting the media device from the first wireless network; establishing the second wireless network; and providing the audio to the wireless speakers for playback over the second wireless network.

In some embodiments, to determine whether or not the media device is a source of the content: (a) it may be determined whether first audio provided by the media device to the display device corresponds to second audio being output from the display device; and/or (b) one or more heuristics may be used to further determine whether the media device is the source. In some embodiments, it may be concluded that the media device is the source if (a) indicates that the media device is the source, and at least one of the heuristics of (b) also indicates that the media device is the source.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for distributing audio when playing content, such as a movie or TV show. In some embodiments, the audio is transmitted over a wireless network to wireless speakers. The wireless network may be a home WIFI network. In addition to transmitting the audio, the home WIFI network may also be used to stream the content, and/or enable what could be a multitude of electronic devices to access the Internet. Due to this heavy use of the home WIFI network, it may take some time to transmit the audio to the wireless speakers when using the home WIFI network, and this may make it difficult to maintain synchronization of the audio and video playback. Accordingly, in some embodiments, a separate wireless connection/network may be established with the wireless speakers. This separate wireless connection/network (or "clean channel") may then be used to transmit the audio to the wireless speakers. Since this separate wireless connection/network is not subject to the burdens of the home WIFI network, the audio may be transmitted significantly faster, thereby better enabling audio/video sync during playback of the content. According to some embodiments, this functionality is achieved by a media device that has only a single wireless radio.

As will be appreciated, most modern WIFI radios can simultaneously connect to a network (for example, act as a client connecting to an Access Point or AP; this may be referred to as the primary network), and create a wireless network of its own (for example, act as an AP and have clients connect to it; this may be referred to as the secondary network). However, the secondary network must share the channel with the primary network, so the secondary network still suffers from congestion caused by traffic on the primary network. This disclosure includes embodiments that operate to move the radio off the main AP channel to a clean channel that is not affected by traffic on the main AP channel.

Figure 1:
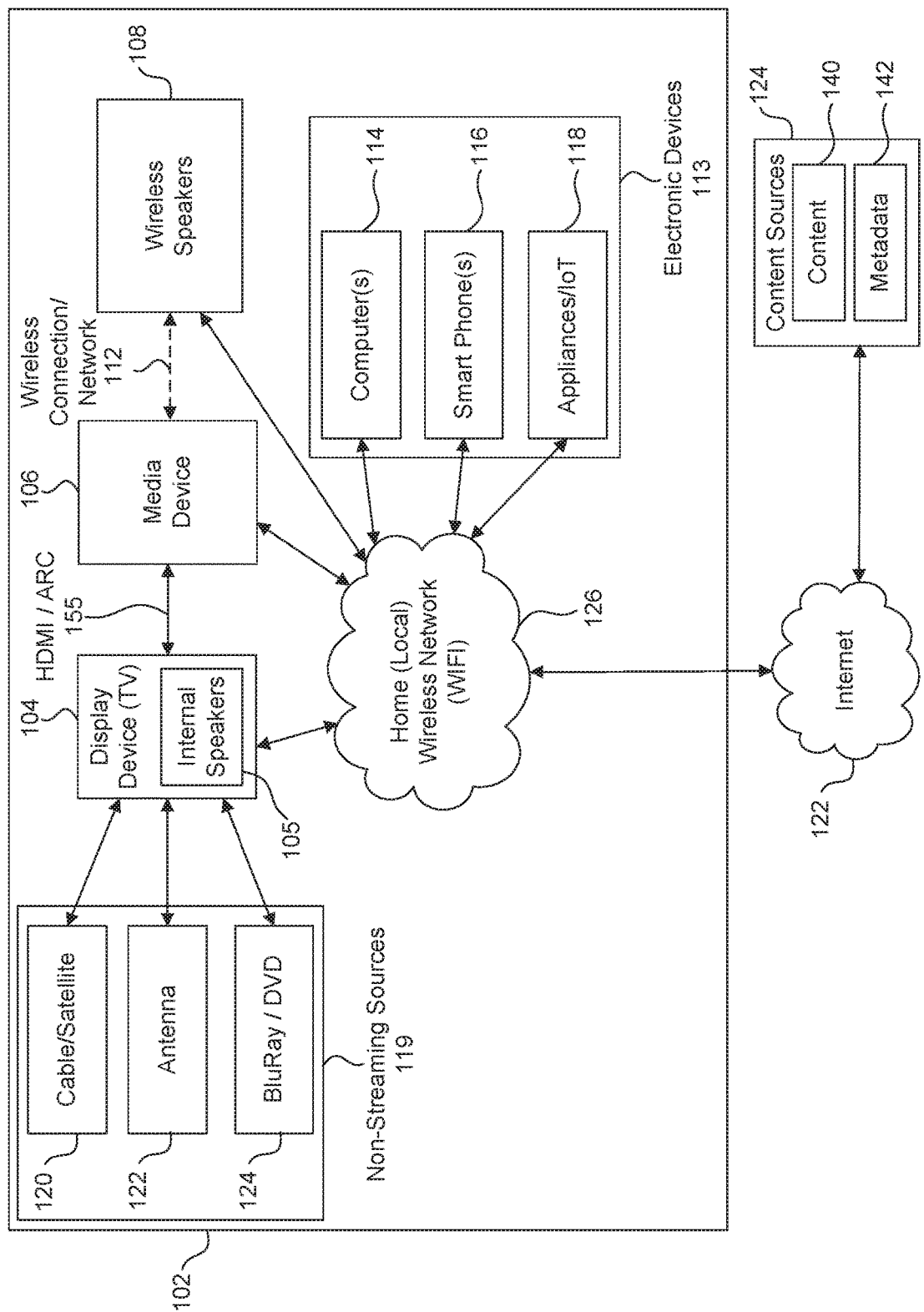
FIG. 1 illustrates a block diagram of a whole home entertainment system, according to some embodiments.

FIG. 1 illustrates a block diagram of a whole home entertainment system 102, according to some embodiments. In a non-limiting example, whole home entertainment system 102 is directed to playing content such as movies, TV shows, games, audio books, and music, to name just some examples. System 102 may be located in a user's home or any other location, such as a business, a park, a stadium, a restaurant, a bar, or a government office, to name just some examples.

Whole home entertainment system 102 may include one or more display devices 104. Display devices 104 may be any combination of monitors, televisions (TVs), computers, smart phones, tablets, wearables (such as a watch), appliances, and/or projectors, to name just some examples. Display devices 104 may include internal speakers 105.

Each display device 104 may be connected to a media device 106. Each media device 106 may be separate from its respective display device 104, or may be part of or integrated with the display device 104.

Each media device 106 may be a streaming media device (that is, a streaming source) that may stream content from content sources 124, and may provide such content to its respective display device 104 for playback to users. For example, a given media device 106 may communicate via a home (or local) wireless network 126 to stream content from content sources 124 via the Internet 122. Wireless network 126 may be any wireless network, wireless medium or communication protocol such as WIFI, Bluetooth, infrared, cellular, etc., or any combination thereof.

In some embodiments, the media device 106 may be connected to its respective display device 104 via a HDMI (high-definition multimedia interface) ARC (audio return channel) connection 155. As will be appreciated by persons skilled in the relevant art(s), the media device 106 may transmit audio and video to the display device 104 over the HDMI ARC connection 155. Also, the media device 106 may receive from the display device 104 over the HDMI ARC connection 155 the audio that is being played by the display device 104. The media device 106 receives the audio in real time from the display device 104, that is, as the audio is played on the display device 104.

Each content source 124 may store content 140 and metadata 142. Content 140 may include any combination of music, videos, movies, TV programs, multimedia, images, still pictures, text, graphics, gaming applications, advertisements, programming content, public service content, government content, local community content, software, and/or any other content or data objects in electronic form.

Metadata 142 may include data about content 140. For example, metadata 142 may include associated or ancillary information indicating or related to writer, director, producer, composer, artist, actor, summary, chapters, production, history, year, trailers, alternate versions, related content, applications, and/or any other information pertaining or relating to the content 140. Metadata 142 may also or alternatively include links to any such information pertaining or relating to the content 140. Metadata 142 may also or alternatively include one or more indexes of content 140, such as but not limited to a trick mode index.

Each display device 104 may also receive content for playback from any number of non-streaming sources 119 in addition to media device 106, such as cable or satellite 120, an over-the-air antenna 122, a Blu-Ray/DVD player 124, etc., to name just some examples.

Each display device 104 may also or alternatively wirelessly receive content from any number of other electronic devices 113 over the home wireless network 126, such as from computers 114, smart phones 116, appliances and internet of things (IoT) devices 118, etc., to name just some examples. Any or all of these electronic devices 113 may also use the home wireless network 126 to access the Internet 122 in a well-known manner.

The whole home entertainment system 102 may include wireless speakers 108. In some embodiments, when playing content (such as music, movies, TV shows, etc.), the audio portion of the content is provided to the wireless speakers 108 for playback (the audio may also or alternatively be provided to the internal speakers 105 in display devices 104 for playback). For example, during streaming, the media device 106 may receive content from content sources 124 via the Internet 122 and the home wireless network 126. Then, the media device 106 may transmit the content to the display device 104 for video playback via the HDMI/ARC connection 155, and may transmit the audio of the content to the wireless speakers 108 via the home wireless network 126 for audio playback.

But, the home wireless network 126 may be burdened by having to stream the content to the media device 106 from content sources 124 (as just described), as well as having to provide connectivity to the Internet 122 to a multitude of electronic devices 113. Due to this burden on the home wireless network 126, it may take some time to transmit the audio to the wireless speakers 108 over the home wireless network 126. For example, it may take 100s of milliseconds to transmit the audio to the wireless speakers 108 over the home wireless network 126, and this latency may greatly vary depending on the load on the home wireless network 126 at any given moment. This latency may make it difficult to maintain audio and video synchronization when content is played. As persons skilled in the relevant art(s) will appreciate, loss of audio/video sync may greatly detract from users' experience when consuming content.

Accordingly, in some embodiments, a new wireless connection or network 112 may be established that is separate from the home wireless network 126. This wireless network/connection 112 may be used to transmit audio from the media device 106 to the wireless speakers 108. Since the wireless network/connection 112 is not burdened like the home wireless network 126 (that is, since the wireless network/connection 112 is a "clean channel"), it make take significantly less time to transmit the audio. For example, in some embodiments, the audio may be transmitted from the media device 106 to the wireless speakers 108 via this wireless connection/network 112 in approximately 20-30 milliseconds. Accordingly, use of the wireless connection/network 112 in this manner makes it much easier to maintain audio/video sync. Also, embodiments of this disclosure achieve these technological advantages while using only a single wireless radio in the media device 106. This shall now be described further.

Figure 2:
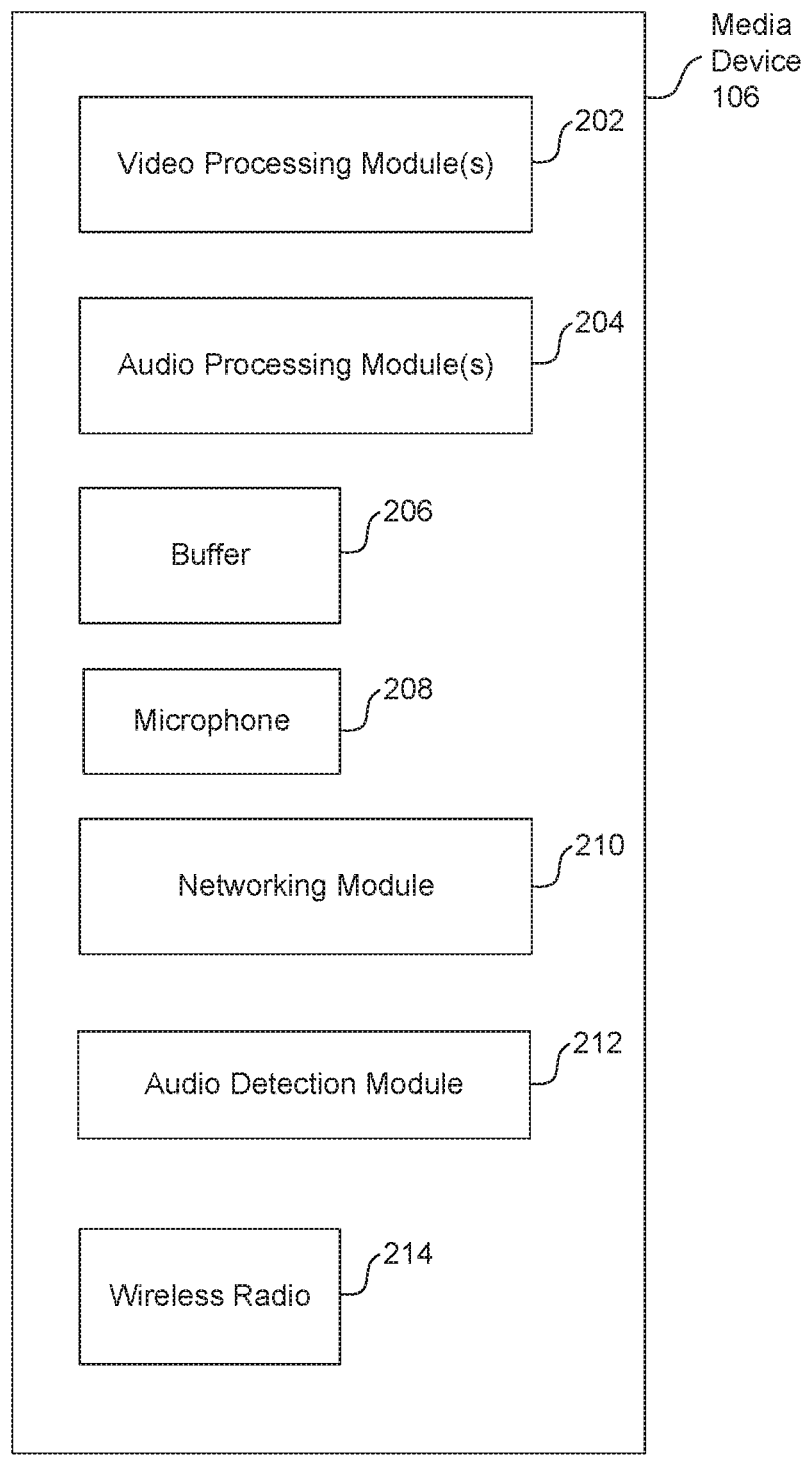
FIG. 2 illustrates a block diagram of a display device, according to some embodiments.

FIG. 2 illustrates an example media device 106, according to some embodiments. The media device 106 may include one or more video processing modules 202, and one or more audio processing modules 204.

Each video processing module 202 may be configured to decode, encode and/or translate video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video processing module 202 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Similarly, each audio processing module 204 may be configured to decode, encode and/or translate audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Media device 106 may also include buffer 206 for buffering video, as well as other types of data.

The media device 106 may include a microphone 208 for receiving audio input, such as spoken audio commands from users, as well as audio output by the internal speakers 105 and/or the wireless speakers 108 while content is being played. The media device 106 may include an audio detection module 212 for detecting the presence or absence of audio being received by the microphone 208. The audio detection module 212 may also be configured to compare and process two or more audio streams; this is further described below.

In some embodiments, the media device 106 includes a single wireless radio 214, for communicating wirelessly in a well-known manner.

Media device 106 may include a networking module 210 for connecting and disconnecting the radio 214 to the home wireless network 126 in a well-known manner. The networking module 210 may be also configured to create, establish and maintain a wireless connection or network 112 using the radio 214, where the wireless connection/network 112 is separate from the home wireless network 126. The networking module 210 may perform this function in any well-known manner, such as via the well-known SoftAP (software enabled access point) technology. However, the networking module 210 is not limited to this example embodiment for creating, establishing and maintaining the wireless connection/network 112.

Figure 3:
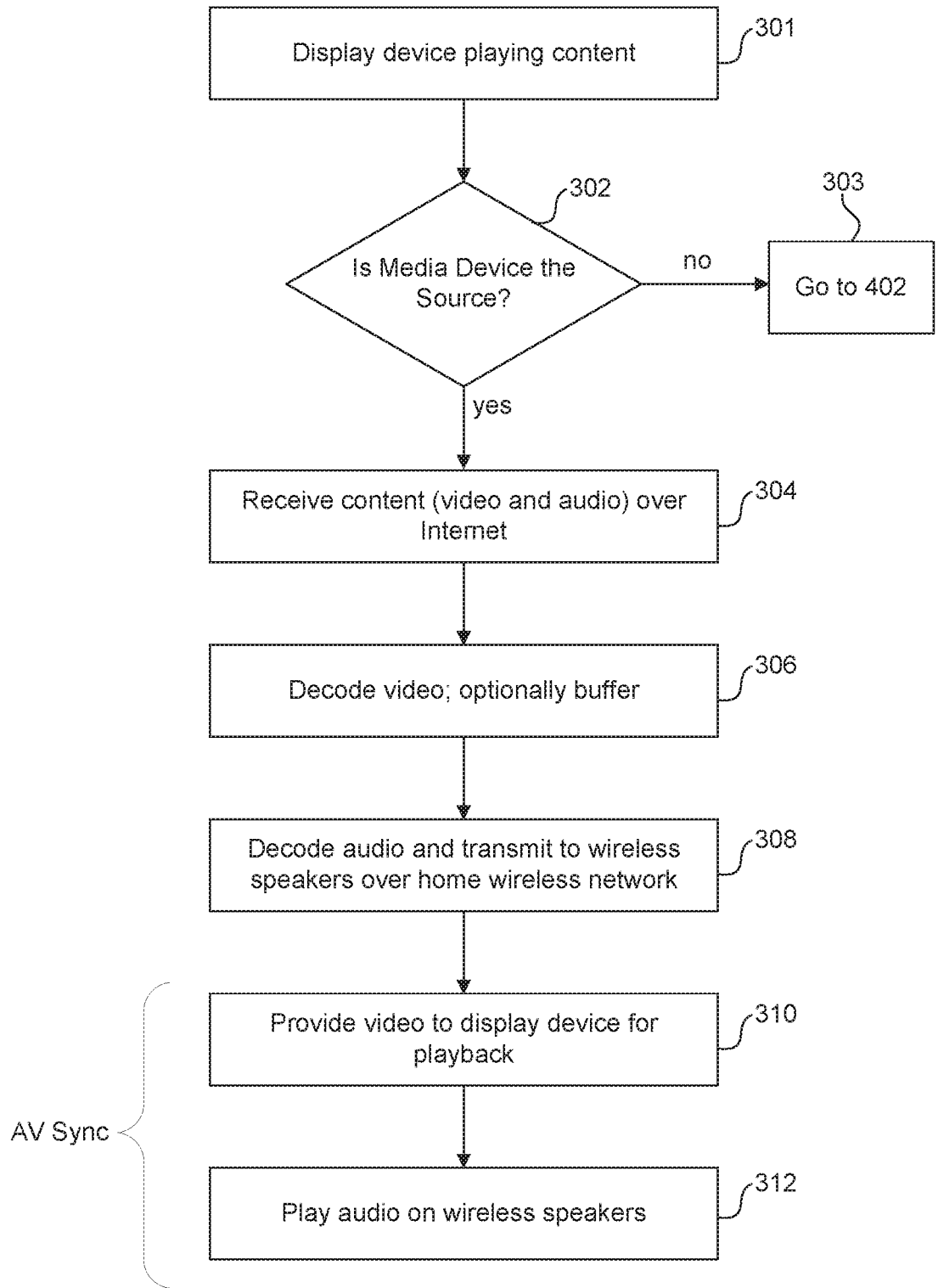
FIGS. 3-5 collectively illustrate a flowchart in a media device for distributing audio to wireless speakers in a whole home entertainment system, where the media device has a single wireless radio, according to some embodiments.
Figure 4:
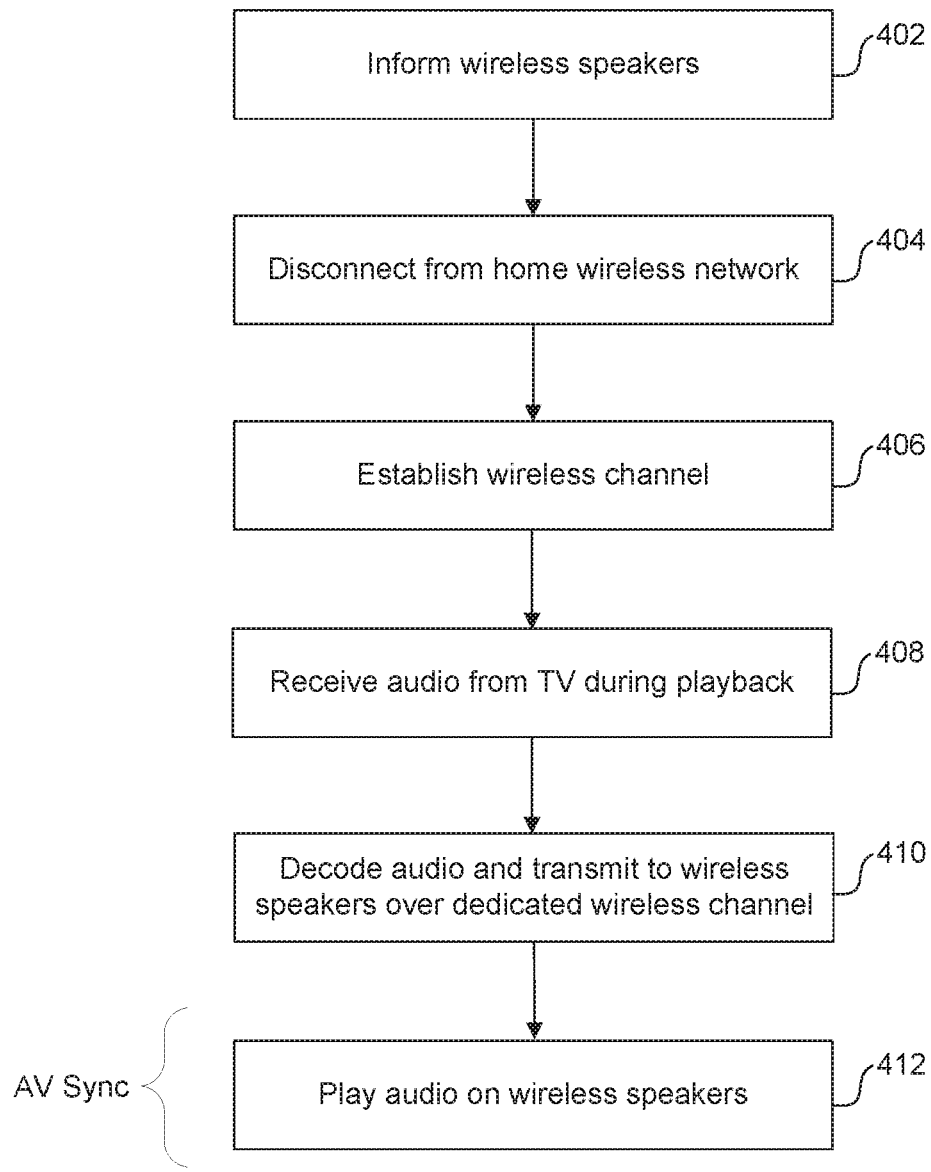

FIGS. 3 and 4 collectively illustrate a method 300 for wirelessly distributing audio while playing content that includes such audio, according to some embodiments.

Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1 and 2. However, method 300 is not limited to those example embodiments.

Method 300 may operate while the display device 104 is playing content, such as a movie, TV show, game, music, etc., to name just some examples. This is indicated by 301.

Figure 5:
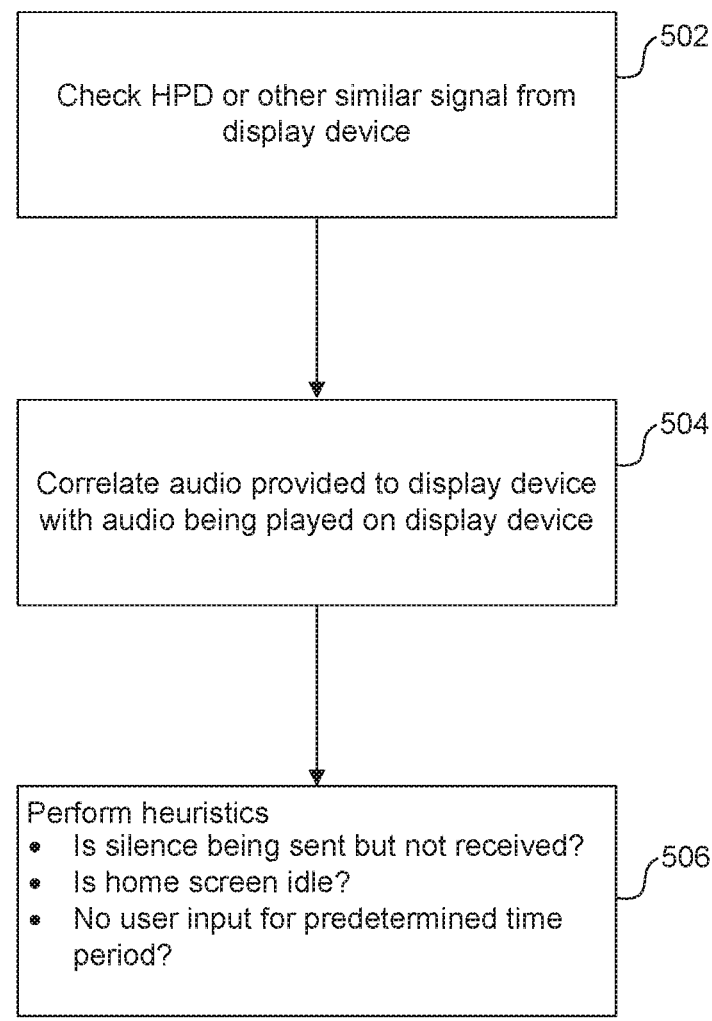

In 302, the media device 106 may determine if it is the source of the content currently being played by the display device 104. Operation of 302 is described below with reference to FIG. 5. If the media device 106 is the source, then 304 is performed.

In 304, the media device 106 may stream the content from a content source 124. In particular, the media device 106 may receive the content from the content source 124 via the Internet 122 and the home wireless network 126. The content may include both video and audio.

In 306, the video processing module 202 of the media device 106 may decode the video, and optionally buffer the decoded video in the buffer 206. Such buffering 206 may be performed to compensate for delays in transmitting the audio to the wireless speakers 108 over the home wireless network 126, to thereby better achieve sync between the audio and video during playback of the content.

In 308, the audio processing module 204 may decode the audio of the content, and then the media device 106 may transmit the decoded audio to the wireless speakers 108 via the home wireless network 126. It is noted that, since the media device 106 includes just a single radio 214, the home wireless network 126 must be used to deliver the audio to the wireless speakers 108, because the home wireless network 126 is also needed by the media device 106 to receive the content from the content source 124 (that is, the media device 106 cannot disconnect from the home wireless network 126 and establish a separate wireless connection/network 112 in the manner that is described below).

In 310 and 312, the video may be provided from the buffer 206 to the display device 104 over the HDMI/ARC connection 155 for playback, and the audio is provided to the wireless speakers 108 over the home wireless network 126 for playback. Since the video was buffered in the buffer 206 to compensate for delays in the home wireless network 126, such playback of video and audio is in sync.

Referring back to 302, if it is determined that the media device 106 is not the source of the content being played on the display device 104, then 402 is performed (see FIG. 4). It is noted that, in this case, the display device 104 may be receiving the content (both audio and video) from one of the non-streaming sources 119, or any other source other than the media device 106.

In 402, the media device 106 may inform the wireless speakers 108 that it should begin communicating via a new wireless connection/network 112. Such operation may be achieved in a well-known manner using signaling or messaging (or any other means) via the home wireless network 126 or any other communication medium, means, methodology, approach and/or technology.

In 404, the networking module 210 of the media device 106 may disconnect the radio 214 from the home wireless network 126, in a well-known manner. Such disconnection is possible in this case, since the media device 106 is not the source of the content being played on the display device 104 and, thus, the home wireless network 126 is not needed to stream content from the content source 124.

In 406, the networking module 210 may create and/or otherwise establish the new wireless connection and/or network 112 in a well-known manner (using SoftAP technology, for example). This wireless connection/network 112 may be different and independent of the home wireless network 126, such that any burdens on the home wireless network 126 (as discussed above) do not impact the wireless connection/network 112. In some embodiments, the wireless connection/network 112 may be dedicated for the transmission of audio data from the media device 106 to the wireless speakers 108.

In 408, the media device 106 may receive the audio of the content from the display device 104, while the content is being played on the display device 104. In the example of FIG. 1, the audio is received via the HDMI/ARC connection 155. In other embodiments, the media device 106 may receive the audio from the display device 104 via other means during playback of the content, such as via SPDIF (SONY/PHILLIPS Digital Interface), analog audio, etc.

In 410, the audio processing module 204 may decode the audio of the content (to the extent necessary), and then the media device 106 may transmit the decoded audio to the wireless speakers 108 via the wireless connection/network 112.

In 414, the audio plays on the wireless speakers 108. Since the audio was provided to the wireless speakers 108 much faster over the wireless connection/network 112 compared to the home wireless network 126 (that is, for example, 20-30 milliseconds versus 100s of milliseconds), the audio and video playback are synchronized. This is the case, even though the video was playing on the display device 104 when the audio was provided to the media device 106 over the HDMI/ARC connection 155 (or via other means, as described above). In practice, there may be some latency between such video playback and audio playback, but due to the greater speed of the wireless connection/network 112, such latency is not so great to be discernable by users experiencing the content.

In some embodiments, the media device 106 may cause the wireless speakers 108 to switch back to the home wireless network 126 to receive audio data. This may occur, for example, if the media device 106 determines that, based on current conditions, traffic on the home wireless network 126 would not prevent audio/video playback sync if the home wireless network 126 was used to transmit the audio to the wireless speakers 108, As discussed above, in 302, the media device 106 may determine if it is the source of the content currently being played by the display device 104. Alternatively, the source of the content may be a non-streaming source 119 (such as cable or satellite 120, antenna 122, Blu-Ray/DVD 124, etc), or any other source. Operation of 302 shall now be described below with reference to FIG. 5.

In 502, the display device 104 may signal or otherwise indicate to the media device 106 that it is or is not the source of content currently being played on the display device 104. The display device 104 may provide such signaling via a hot plug detect (HPD) pin of the HDMI/ARC connection 155, or through any other well-known means, approach, functionality, mechanism or technology. However, some display devices 104 may leave the HPD pin active (or inactive) irrespective of the current source. Accordingly, in some embodiments, even if the display device 104 indicates through the HPD pin that the media device 106 is (or is not) the source, 504 and/or 506 may still be performed.

In 504, the audio detection module 212 of the media device 106 compares the audio being provided by the media device 106 to the display device 104 over the HDMI/ARC connection 155, to the audio being received by the media device 106 from the display device 104 over the HDMI/ARC connection 155, to determine whether the display device 104 is playing the audio that is being provided by the media device 106. If it is determined that the display device 104 is playing the audio that is being provided by the media device 106, then the audio detection module 212 concludes that the media device 106 is the source. In some embodiments, the audio detection module 212 performs such comparison using any one or combination of well-known correlation methods, techniques, procedures, approaches and/or technologies.

It is noted that the comparison of 504 may be possible even when the HDMI connection 155 is not ARC (or the audio is being delivered via other means such as SPDIF, analog audio, etc.). For example, the audio detection module 212 may instead compare the audio being provided by the media device 106 to the display device 104, to the audio output by the display device 104 using internal speakers 105 (or wireless speakers 108) and received by the media device 106 via microphone 208.

It is noted that it may not be possible for the audio detection module 212 to conclude with substantial certainty that the display device 104 is playing the audio that is being provided by the media device 106. This may be case for a number of reasons. For example, the display device 104 may process the audio before playing it back (to enhance quality or add sound effects, for example). Therefore, even when the audio detection module 212 in 504 concludes that it is likely that the media device 106 is the source, 506 may be performed.

In 506, the audio detection module 212 performs one or more heuristics to determine with more certainty whether the media device 106 is the source. For example, the audio detection module 212 may cause silence to be sent to the display device 104, and determine whether the display device 104 is outputting silence. If the display device 104 is outputting silence, then it is more likely that the media device 106 is the source; otherwise, it is more likely the media device 106 is not the source.

More generally, the audio detection module 212 may cause known data to be sent to the display device 104, and determine whether the display device 104 is outputting such data. If the display device 104 is outputting the known data, then it is more likely that the media device 106 is the source; otherwise, it is more likely the media device 106 is not the source.

As another example, the audio detection module 212 may detect if users have interacted with the media device 106 within a given time period. For example, the audio detection module 212 may determine if users have used a remote control (not shown in FIG. 1) to interact with a user interface of the media device 106, or have used pause/rewind/fast forward/stop (etc.) buttons of the remote control to control playback by the media device 106. If users have interacted with the media device 106 within the given time period, then it is more likely the media device 106 is the source; otherwise, it is less likely the media device 106 is the source.

In some embodiments, if any of 502, 504 and/or 506 indicates that the media device 106 is the source, then the audio detection module 212 concludes that the media device 106 is the source. Otherwise, the audio detection module 212 concludes that the media device 106 is not the source.

In other embodiments, at least two of 502, 504 and 506 would have to indicate that the media device 106 is the source, in order for the audio detection module 212 to conclude that the media device 106 is the source. Otherwise, the audio detection module 212 concludes that the media device 106 is not the source.

In other embodiments, 504 and at least one of the heuristics of 506 would have to indicate that the media device 106 is the source, in order for the audio detection module 212 to conclude that the media device 106 is the source. Otherwise, the audio detection module 212 concludes that the media device 106 is not the source.

Example Computer System

Figure 6:
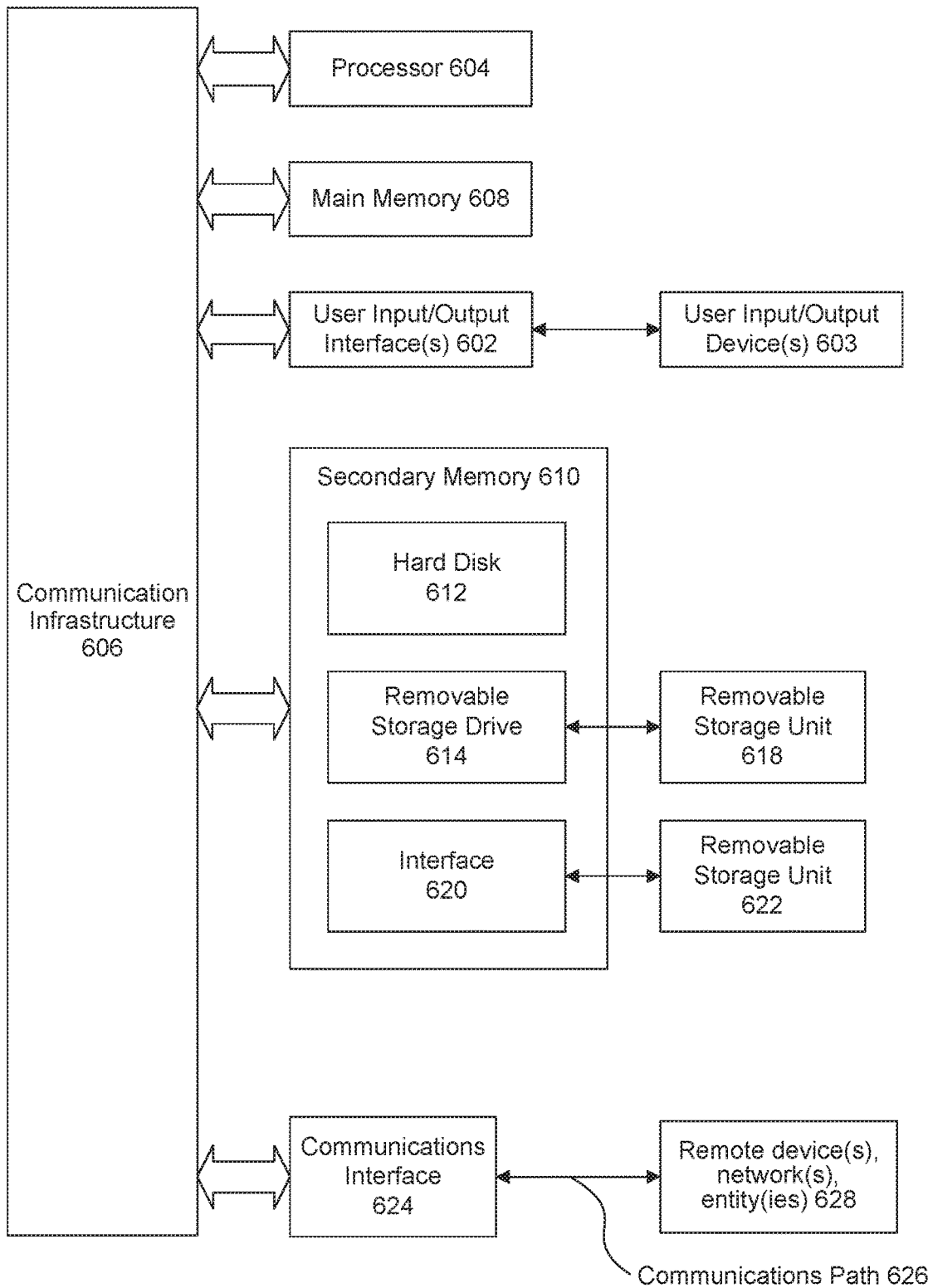
FIG. 6 illustrates an example computer system useful for implementing various embodiments.

Various embodiments and/or components therein can be implemented, for example, using one or more computer systems, such as computer system 600 shown in FIG. 6. Computer system 600 can be any computer or computing device capable of performing the functions described herein. For example, one or more computer systems 600 or portions thereof can be used to implement any embodiments of FIGS. 1-5, and/or any combination or sub-combination thereof.

Computer system 600 includes one or more processors (also called central processing units, or CPUs), such as a processor 604. Processor 604 is connected to a communication infrastructure or bus 606.

One or more processors 604 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 can include other means, instrumentalities or other approaches for allowing computer programs and/or other instructions and/or data to be accessed by computer system 600. Such means, instrumentalities or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method in a media device for distributing audio to wireless speakers while content comprising the audio is being played on a display device, wherein the media device includes a single wireless radio, the method comprising:
    determining that the media device is not a source of the content, such that the media device does not need to stream the content over a first wireless network;
    informing the audio speakers to switch from the first wireless network to a second wireless network;
    disconnecting the media device from the first wireless network;
    establishing the second wireless network; and
    providing the audio to the wireless speakers for playback over the second wireless network.

2. The method of claim 1, wherein the content also comprises video, and wherein using the second wireless network to provide the audio to the wireless speakers takes less time than using the first wireless network, such that playback of the audio is synchronized with playback of the video.

3. The method of claim 1, wherein the determining comprises:
    (a) determining whether first audio provided by the media device to the display device corresponds to second audio being output from the display device;
    (b) using one or more heuristics to further determine whether the media device is the source; and
    (c) concluding that the media device is the source if (a) indicates that the media device is the source, and/or at least one of the heuristics of (b) indicates that the media device is the source.

4. The method of claim 3, wherein (a) comprises:
    receiving the second audio by the media device from the display device via a connection between the media device and the display device.

5. The method of claim 3, wherein (a) comprises:
    receiving the second audio by the media device by using a microphone that listens for audio output by the display device.

6. The method of claim 3, wherein the heuristics comprise:
    (a) sending known data to the display device, and determining whether the display device outputs the known data; and
    (b) determining whether a user has accessed the media device within a predetermined time period.

7. A tangible computer-readable device having instructions stored thereon that, when executed by at least one computing device, cause the at least one computing device to perform operations in a media device to distribute audio to wireless speakers while content comprising the audio is being played on a display device, wherein the media device includes a single wireless radio, the operations comprising:
    determining that the media device is not a source of the content, such that the media device does not need to stream the content over a first wireless network;
    informing the audio speakers to switch from the first wireless network to a second wireless network;
    disconnecting the media device from the first wireless network;
    establishing the second wireless network; and
    providing the audio to the wireless speakers for playback over the second wireless network.

8. The tangible computer-readable device of claim 7, wherein the content also comprises video, and wherein using the second wireless network to provide the audio to the wireless speakers takes less time than using the first wireless network, such that playback of the audio is synchronized with playback of the video.

9. The tangible computer-readable device of claim 7, wherein the determining comprises:
    (a) determining whether first audio provided by the media device to the display device corresponds to second audio being output from the display device;
    (b) using one or more heuristics to further determine whether the media device is the source; and
    (c) concluding that the media device is the source if (a) indicates that the media device is the source, and/or at least one of the heuristics of (b) indicates that the media device is the source.

10. The tangible computer-readable device of claim 9, wherein (a) comprises:
    receiving the second audio by the media device from the display device via a connection between the media device and the display device.

11. The tangible computer-readable device of claim 9, wherein (a) comprises:
    receiving the second audio by the media device by using a microphone that listens for audio output by the display device.

12. The tangible computer-readable device of claim 9, wherein the heuristics comprise:
    (a) sending known data to the display device, and determining whether the display device outputs the known data; and
    (b) determining whether a user has accessed the media device within a predetermined time period.

13. A media device for distributing audio to wireless speakers while content comprising the audio is being played on a display device, comprising:
    a single wireless radio; and
    at least one processor configured to:
        determine that the media device is not a source of the content, such that the media device does not need to stream the content over a first wireless network;
        inform the audio speakers to switch from the first wireless network to a second wireless network;
        disconnect the media device from the first wireless network;
        establish the second wireless network; and
        provide the audio to the wireless speakers for playback over the second wireless network.

14. The media device of claim 13, wherein the content also comprises video, and wherein using the second wireless network to provide the audio to the wireless speakers takes less time than using the first wireless network, such that playback of the audio is synchronized with playback of the video.

15. The media device of claim 13, wherein to determine, the at least one processor is further configured to:
    (a) determine whether first audio provided by the media device to the display device corresponds to second audio being output from the display device;
    (b) use one or more heuristics to further determine whether the media device is the source; and (c) conclude that the media device is the source if (a) indicates that the media device is the source, and/or at least one of the heuristics of (b) indicates that the media device is the source.

16. The media device of claim 15, wherein to perform (a), the at least one processor is further configured to:
   receive the second audio by the media device from the display device via a connection between the media device and the display device.

17. The media device of claim 15, wherein to perform (a), the at least one processor is further configured to:
   receive the second audio by the media device by using a microphone that listens for audio output by the display device.

18. The media device of claim 15, wherein to use the heuristics, the at least one processor is further configured to:
   (a) send known data to the display device, and determining whether the display device outputs the known data; and
   (b) determine whether a user has accessed the media device within a predetermined time period.

19. The media device of claim 13, the at least one processor further configured to cause the audio speakers to switch to the first wireless network to receive the audio.

* * * * *